Feb. 3, 1970 V. S. RACKI 3,492,931
PHOTOGRAPHIC CAMERA WITH SWINGING-THROUGH SHUTTER BLADES
Filed May 9, 1966 6 Sheets-Sheet 2
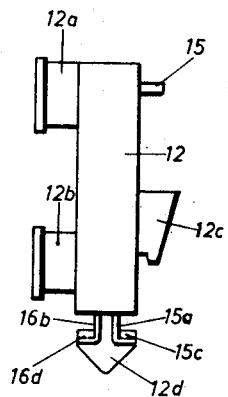
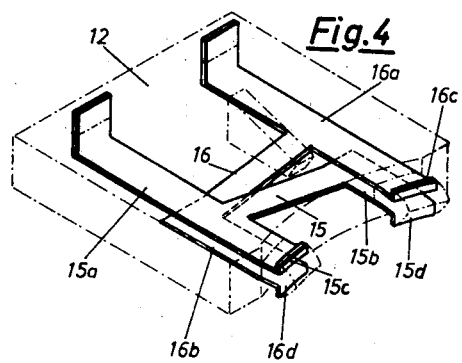
Fig.4
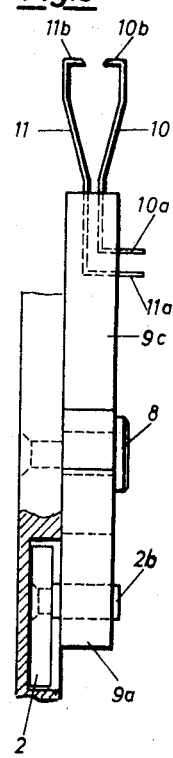
Fig.3
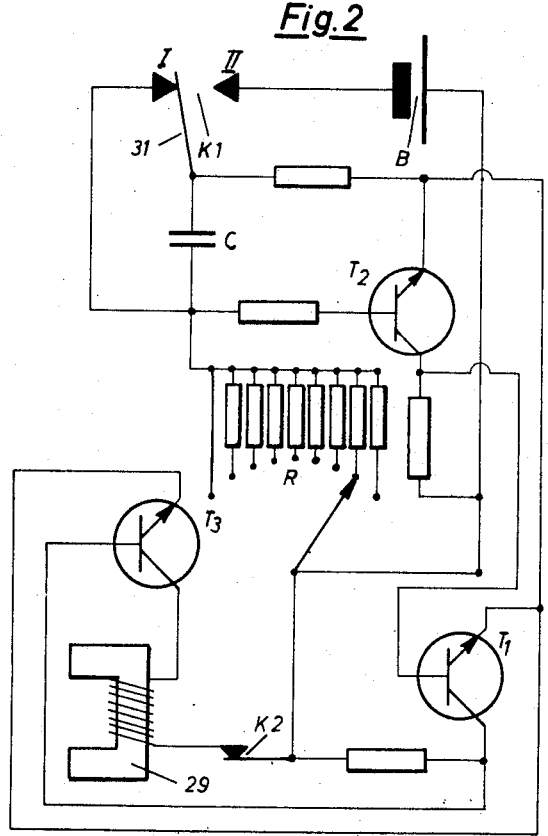
Fig.2
INVENTOR
Vladimir S. Racki
BY
Arthur A. March
ATTORNEY

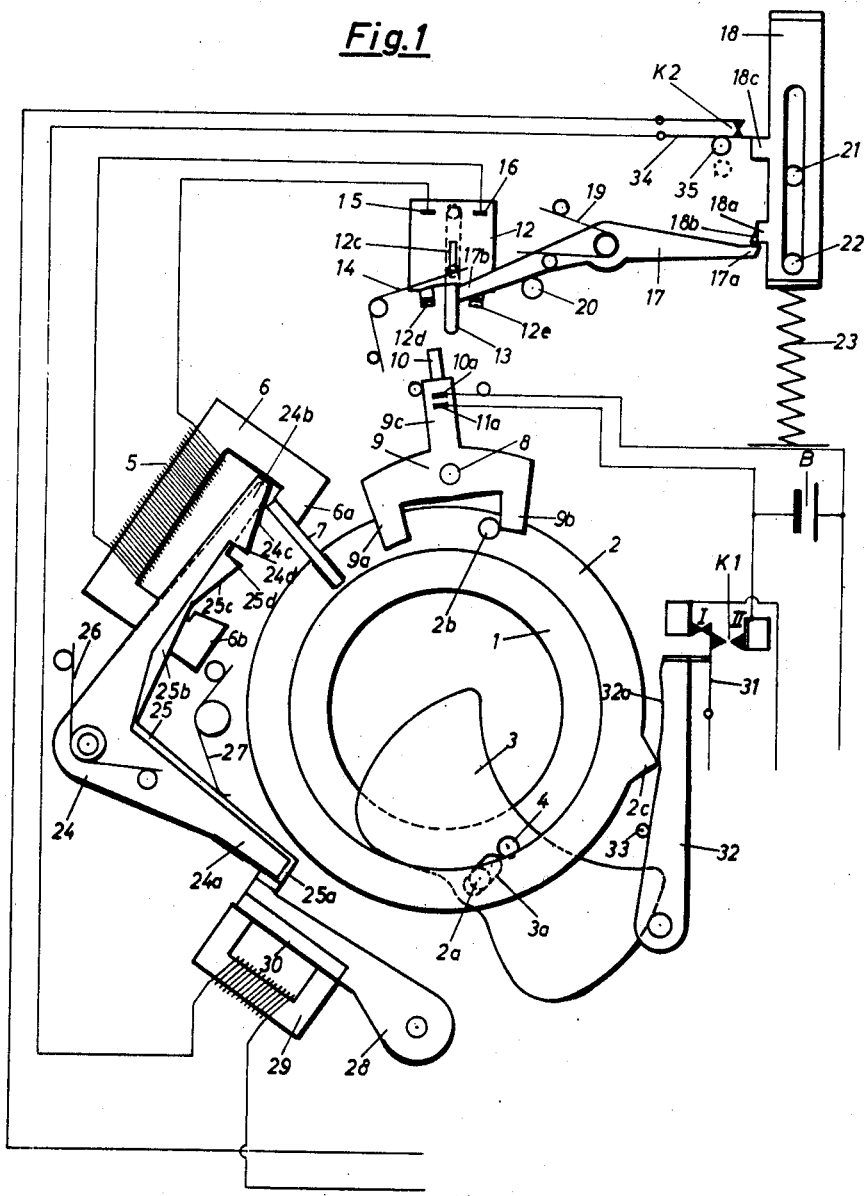

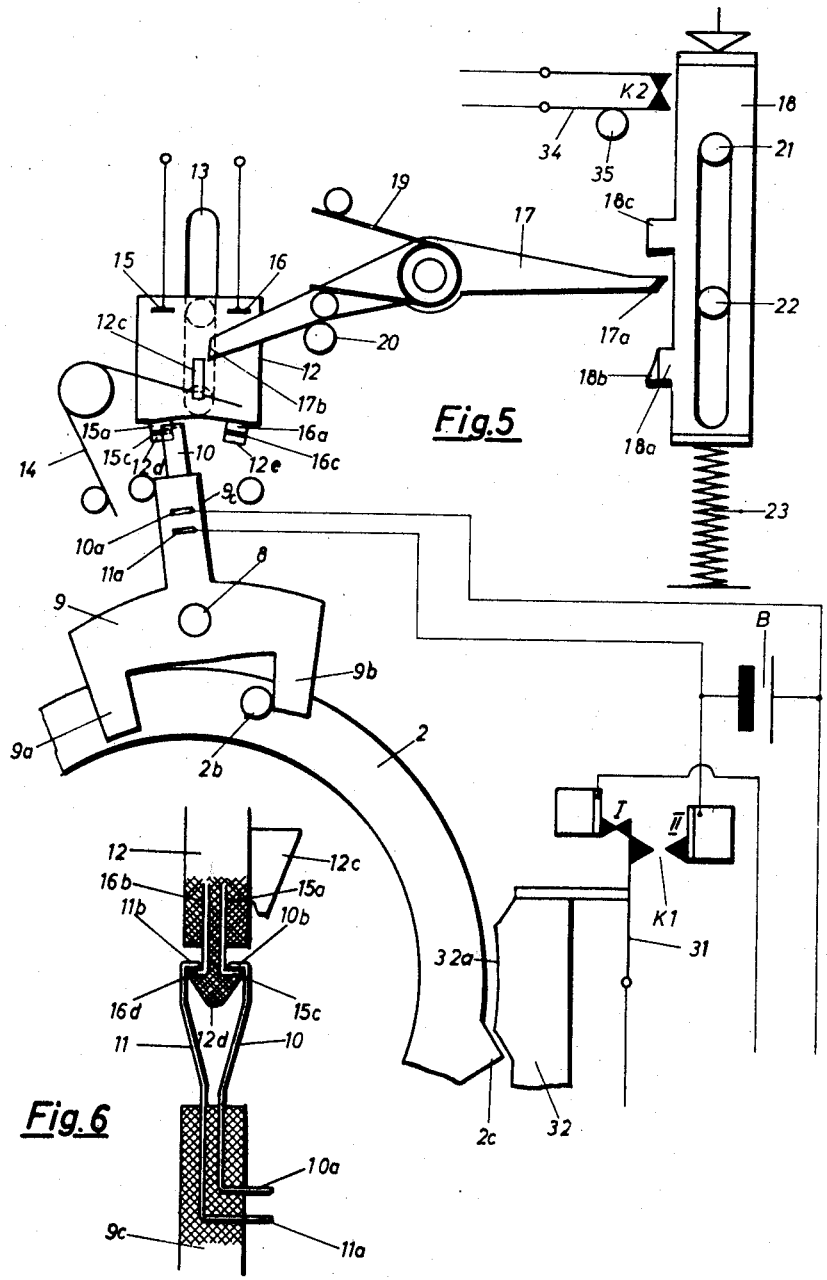

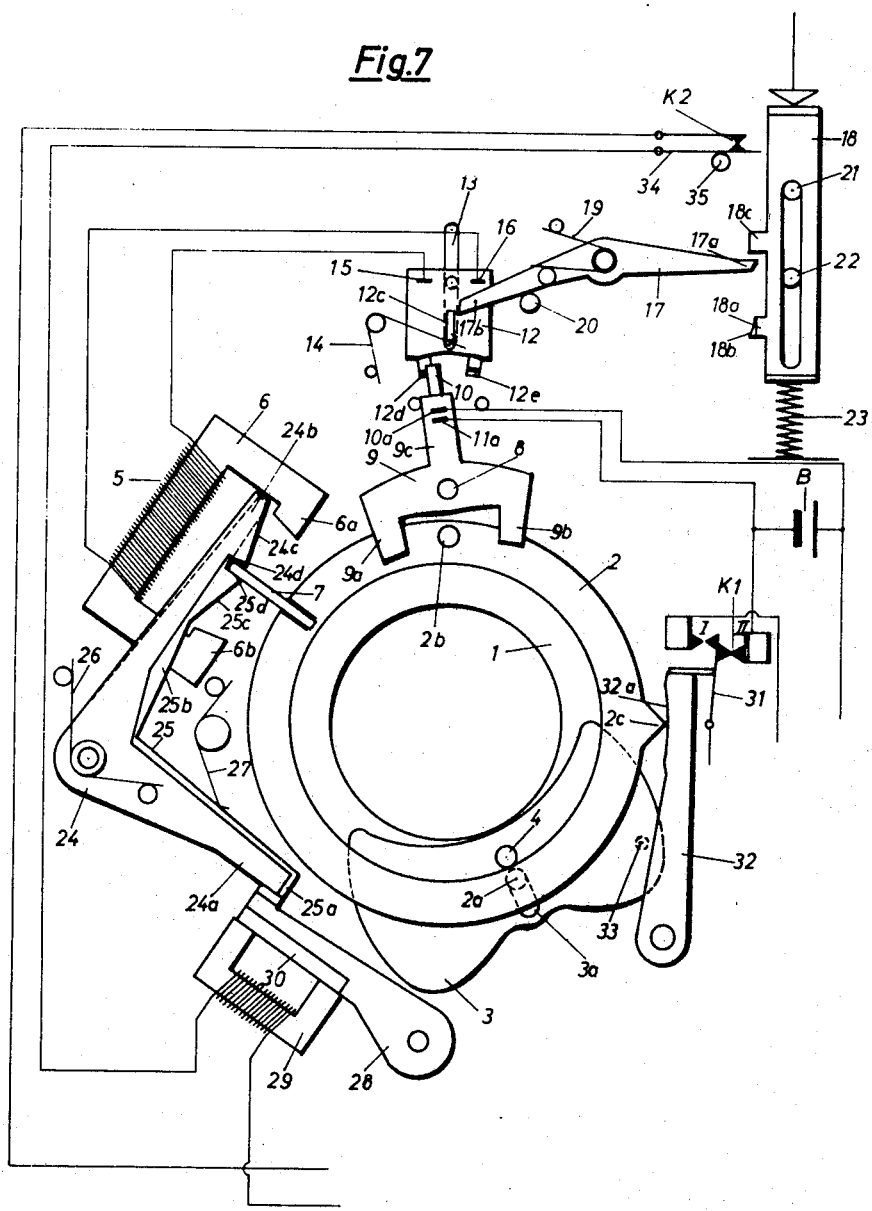

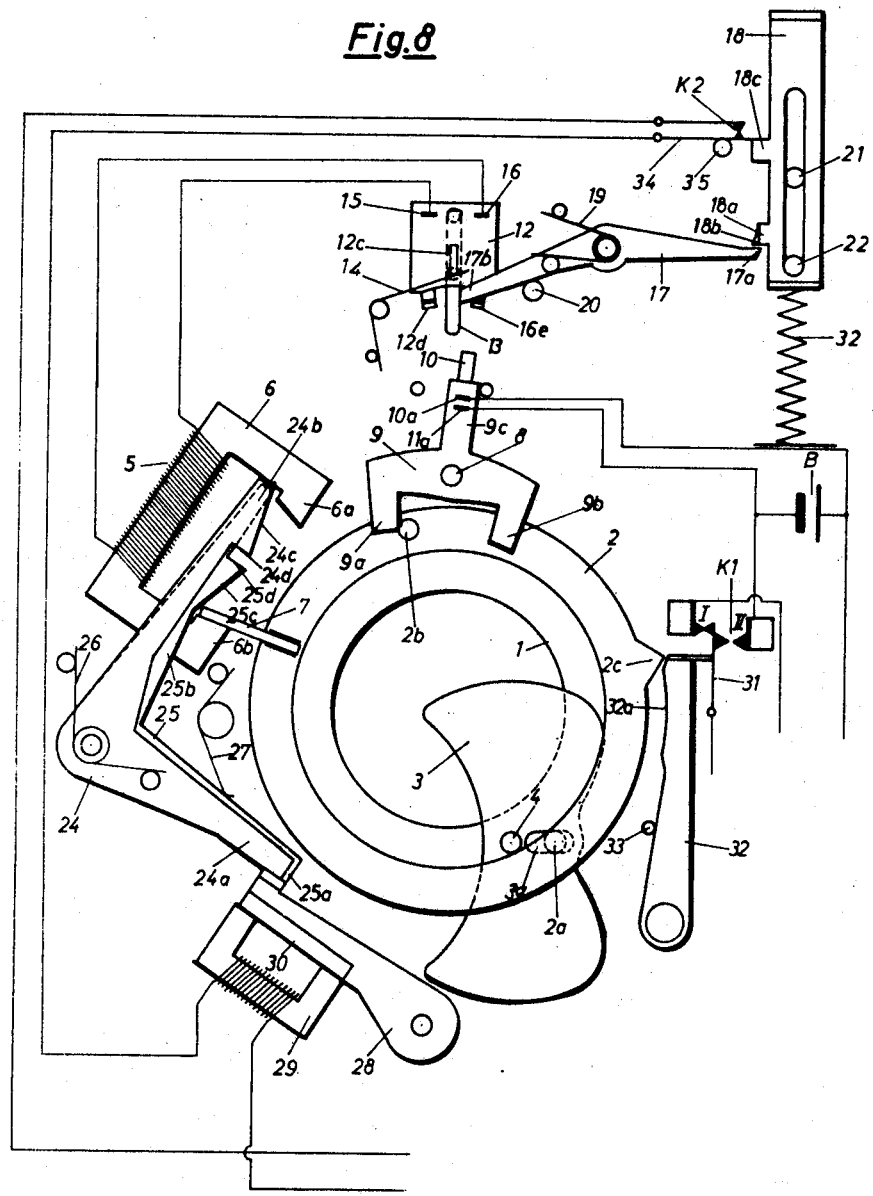

Feb. 3, 1970    V. S. RACKI    3,492,931
PHOTOGRAPHIC CAMERA WITH SWINGING-THROUGH SHUTTER BLADES
Filed May 9, 1966    6 Sheets-Sheet 6

INVENTOR
Vladimir S. Racki
BY
Arthur A. March
ATTORNEY

United States Patent Office 3,492,931
Patented Feb. 3, 1970

3,492,931
PHOTOGRAPHIC CAMERA WITH SWINGING-THROUGH SHUTTER BLADES
Vladimir S. Racki, Calmbach, Black Forest, Germany, assignor to Prontor-Werk Alfred Gauthier, G.m.b.H., Calmbach, Black Forest, Germany, a corporation of Germany
Filed May 9, 1966, Ser. No. 548,768
Claims priority, application Germany, May 10, 1965, P 36,754
Int. Cl. G03b 9/20
U.S. Cl. 95—61    13 Claims

ABSTRACT OF THE DISCLOSURE

A photographic camera is provided with swing-through shutter blades and which is capable of rotation in one direction during an exposure process and in the opposite direction during the next exposure. The camera has an electromagnetic device for driving the blade operating ring and a device for reversing the direction of current through the electromagnetic device after the exposure process. An exposure time setting number provides the desired exposure time and may be pre-set. A blocking device is associated with the electromagnetic device for blocking the blade operating ring for the duration of the pre-set exposure time with the shutter blades in the open position. An electromagnetic operated actuating device is associated with the blocking device and an electromagnetic circuit controls the electromagnetic actuating device. The actuating device moves the blocking device out of the blocking position at the expiration of the exposure time.

---

The present invention relates to a photographic shutter with swinging-through blades and with a blade operating ring which can be moved in one direction of rotation during one exposure process, and in the opposite direction of rotation during the next exposure.

Shutters of this type were, heretofore, equipped with a mechanical driving system which was associated with a mechanical escapement device for the purpose of obtaining different exposure times.

The object of the invention is to equip a shutter of the type as described in the first paragraph with an electromagnetic driving system associated with an electronically controlled escapement device so that proper operation of the shutter is assured.

In this connection, the invention provides an electromagnetic system which has the direction of its current reversed after the exposure process. A mechanical device is associated with the electromagnetic system to block the ring for the duration of the preset exposure time when the lens aperture is fully released. This mechanical device is associated with an electromagnetic means controlled by an electronic circuit. The electromagnetic means moves the mechanical device in a positive manner from the blocking position into inoperative position. With this arrangement, a swinging-through blade shutter is realized, wherein both the drive of the blades and their control during the exposure process is carried out with a minimum of mechanical transmission elements. Such design assures, in turn, a high degree of reliability in the operating of the shutter. The use of electric and electronic devices for the drive and control of the blade operating ring, makes the swinging-through blade shutter especially adaptable to short exposure times.

With regard to the arrangement of the electromagnetic system designed to drive the blade operating ring, another embodiment of the invention provides that the system include a fixed electromagnet and a bar-shaped permanent magnet fixed on the blade operating ring, so that a free end of the bar magnet project into the magnetic field of the electromagnet. The electromagnet, furthermore, may be connected to a battery by means of a switch which can be moved into the contact position by an intermediate lever that has been conveyed into cocked position while a release slide is being actuated. This avoids unnecessary drain of the battery since the switch is closed only for the duration of the exposure process.

In order to obtain a simple as well as reliable operating device for reversing the direction of current, the invention provides that this latter device include a control element which can be conveyed into two extreme positions. The control element carries two contacts, each of which is connected to a pole of the battery. The contacts are associated with two intersecting contact members electrically connected to the coil of the electromagnet designed to drive the blade operating ring. Each one of these contact members is provided with two taps so that, when the circuit is closed, the current flows through the coil in one direction corresponding to one extreme position of the control element, and flows in the opposite direction when the control element is in the other extreme position. This arrangement for reversing the current, allows a number of ways in which the polarity of the electromagnet designed to drive the blade operating ring, may be reversed. For example, in order to produce polarity reversal of the electromagnet by the shutter itself, the control element may be designed in the form of a rotatably positioned, three-armed fork. Two arms of the fork extend towards the center of the blade operating ring, and cooperate alternately with a projection situated on the latter during its executing motion. The arrangement is such that the projection impinges, in the final phase of the executing motion, on one of the arms and moves the fork from one extreme position to the other. When the fork is in the latter position, its third arm carrying two contact springs may be electrically connected to a polarity reversing slide which receives the two intersecting contact members. This design results in an especially simple and space-saving structure, since both the polarity reversal of the electromagnet and the connection of the electromagnet to the battery are carried out by the same means. To assure reliable operation of the device which reverses the current direction, the invention provides that the polarity reversing slide be connected to the fork by means of an intermediate lever conveyed into cocked position, against the action of a restoring spring. The connection is releasable by the impingement of the projection of the blade operating ring, on the fork, and by the polarity reversing slide being movable into the starting position by the restoring spring.

Current reversal is obtained with comparatively simple means since each of the contact members has the shape of an h, and they are arranged in the polarity-reversing slide so that the two members point with the base in the same direction, with the long leg of one member being located above the short leg of the other member in a superjacent manner.

In accordance with the invention, the device which becomes operative during the executing motion of the shutter and which blocks the blade operating ring in the open position, comprises two coaxially positioned arresting levers. Each of these levers is held in the arresting position due to the action of a spring, and each is provided with an arresting edge which is located within the range of motion of a projection of the blade operating ring. During the executing motion, the arresting edge retains the ring in the open position of the swinging-through blades, corresponding to the duration of the pre-set exposure time. An advantageous feature of the invention is a magnetic lever which moves the arresting levers out of the arresting position. The magnetic lever is supported by an electromagnet through means of a permanent magnet.

In yet another embodiment of the invention, positive actuation of the arresting levers in response to the shutter executing motion, may be obtained with the electromagnet associated with the arresting levers. The electromagnet may be connected to the battery by a contact switch which can be conveyed into its circuit closure position by means of the blade operating ring. The electromagnet can be controlled by means of the electronic circuit associated with the exposure time setting member, so that current flows in the electromagnet only after the preset exposure time has elapsed. This current has the effect of repelling the permanent magnet from the electromagnet, and conveying, thereby, the arresting levers into the non-operating position.

In order to realize "B" exposures with the swinging-through blade shutter that is electromagnetically driven and electronically controlled, an interrupter switch is arranged in the circuit of the electromagnet designed to influence the arresting levers. The interrupter switch remains closed when the exposure time setting member is set within the range for instantaneous exposure times. However, the switch can be conveyed into open position with the actuation of the release slide when the exposure time setting member is set at "B."

The polarity reversal of the electromagnet designed to drive the blade operating ring, can also be coupled to the action and process which returns the camera to its operating position. In this connection, another embodiment of the invention provides that the control element for reversing the current, be formed of a two-armed lever which can be alternately moved into one of two extreme positions by the film transport lever of the camera. In this case, the electric device of the shutter arrangement can be simplified by connecting to the battery with a single contact switch, the electromagnet for driving the blade operating ring, the electromagnet designed to influence the arresting levers, and the electronic operating device. The release slide can convey the contact switch into its circuit closure position in which it is held by the blade operating ring during the latter's executing motion.

Two embodiments of the invention are described in the following specification accompanied by drawings in which:

FIGURE 1 is a diagrammatic view of a swinging-through blade shutter in one end position, and shows the drive as an electromagnetic system whose polarity can be reversed by the shutter, and which is associated with an electronic timing circuit;

FIGURE 2 shows the wiring diagram for the electronic timing circuit;

FIGURE 3 is a side view on an enlarged scale, and shows the fork designed for polarity reversal and connecting the driving electromagnets to the power source, as well as the polarity reversing slide cooperating with the fork;

FIGURE 4 is a perspective view which shows the contact members arranged in the polarity reversal slide, with the latter indicated by dash-dot lines;

FIGURE 5 shows the fork connected to the polarity reversing slide after release of the shutter, in one extreme position, whereby the blade operating ring still occupies the non-operating position and the electronic circuit is disconnected from the power source of battery;

FIGURE 6 is a side view on an enlarged scale, and shows the connection of the fork with the polarity reversing slide;

FIGURE 7 shows the shutter blocked in the open position by a lever locking device;

FIGURE 8 shows the shutter in the closed position, but in which the blade operating ring and the members associated therewith occupy the other extreme position;

Figure 9:
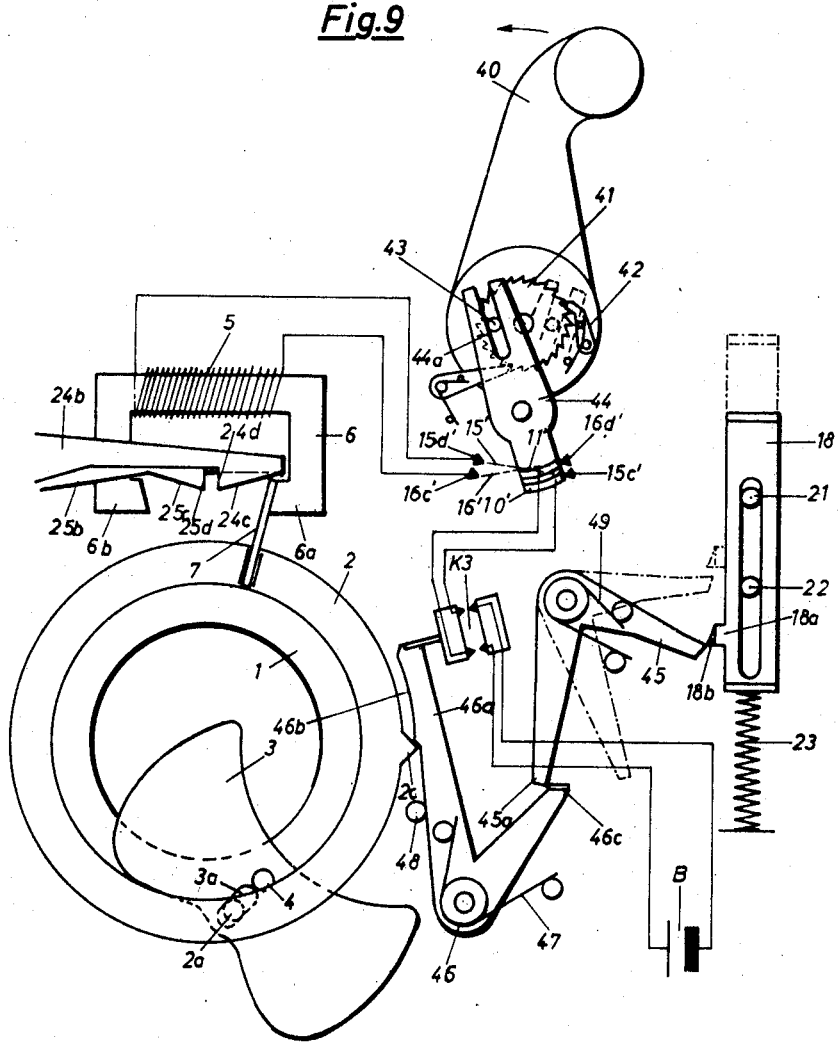
FIGURE 9 shows an electromagnetically driven and electronically controlled shutter arrangement, wherein the polarity reversal of the driving electromagnet is coupled with the film transport mechanism, in the final phase of the release motion.

Referring to the drawing, the tubular socket of a shutter base plate (not shown) of a photographic intra-lens shutter, is designated by 1. Rotatably positioned on the tubular socket, is a blade operating ring 2 which is connected to a plurality of swinging-through blades 3 by means of the pin-slot arrangements 2a, 3a. Pins 4 serve as fixed bearings for the blades 3, only one of which is shown for the sake of simplicity.

The driving device for the blade operating ring 2 is an electromagnetic system. The latter comprises a fixed electromagnet formed of a coil 5 and an iron core 6, as well as a bar-shaped permanent magnet 7 secured to the blade operating ring. The arrangement is such that the free end of the permanent magnet projects into the field of the electromagnet 5–6, and adheres to the pole 6a when the shutter is in the extreme position shown in FIG. 1. On the other hand, the magnet 7 adheres to pole 6b when the shutter is in the other extreme position shown in FIG. 7. In order to supply the electromagnet 5–6 with current, a battery B is used which can be electrically connected to the coil 5 by means of a contact-making device. In the embodiment illustrated in FIGS. 1–8, this device is also provided for the polarity reversal of the electromagnet 5–6, which is advantageously carried out by the shutter itself.

The contact-making and current-reversing device comprises a three-armed fork 9 which is rotatably positioned on a pin 8. Two arms 9a and 9b, of the fork, co-operate alternately with a driving pin 2b arranged on the blade operating ring 2. As especially apparent from FIG. 3, two contact springs 10 and 11 are provided on a third arm 9c of the fork 9. Each of these contact springs includes a contact end 10a or 11a electrically connected to a pole of the battery B. The fork may be made of die-cast or injection-molded material, and the two contact springs 10 and 11 may be cast directly into the arm 9c. At their free ends, the two contact springs 10 and 11 are in the form of hook-shaped members 10b and 11b facing each other, respectively. For the purpose of making contact, a slide 12 is associated with the fork 9. The slide 12 can be moved towards the fork by means of two lugs 12a and 12b in a fixed guide slot 13 situated, for example, in the baseplate of the shutter. The slide may be held in the contact-free end position, shown in FIGS. 1 and 3, by a restoring spring 14 which acts, in turn, on an inclined lug 12c of the slide.

As evident from FIG. 4, the slide 12 carries two contact elements 15 and 16, each of which has approximately the shape of an h and is connected to a terminal of the coil 5. For the purpose of obtaining a reversal in the direction of current, the two contact elements 15 and 16 are arranged in an intersecting manner so that the long leg 15a or 16a of one contact element, is located above the short leg 16b or 15b of the other contact element. The ends of the legs of contacts 15 and 16, which face contact springs 10 and 11 are bent-up members 15c and 15d or 16c and 16d. The members 15c and 16c provided at the ends of the long legs located on top, extend upward. The short legs located at the bottom, on the other hand, are downward-bent lugs 15b and 16b.

The slide 12 designated as the polarity reversal slide because of its double function, is made of plastic injection-molded material due to technical production factors. The contacts 15 and 16 are also cast of this material. In order to avoid contact between the legs of elements 15 and 16 which project from the slide 12, two lugs 12d and 12e are cast with the slide. Each of these lugs is situated between two associated leg ends. In particular, and as illustrated in FIGURE 3, the lugs 12d and 12e carry at their free ends arrowheads, beyond which are located the bent-up members 15c and 16d or 15d and 16c of the contacts 15 and 16. As shown in FIGURE 5, the arrowhead of the lugs 12d and 12e serve the purpose of allowing a cooperable connection between the slide 12 and the fork 9 during the release process of the camera. This assures, in turn, a proper electric connection between these members while the shutter is in its executing period.

The engagement of the polarity reversal slide 12 with the contact springs 10 and 11 of fork 9 is established by a two-armed, intermediate lever 17 which cooperates with a slide 18 designed to release the camera. When in the non-operating position, the intermediate lever 17 engages a pin 20 due to the action of spring 19. The slide 18 is, in turn, movably guided by pins 21 and 22. In the non-operating position, slide 18 engages pin 22 due to the action of compression spring 23. A lug 18a which carries a bent-up and beveled tab 18b, is provided on the release slide 18. The lug 18b is located within the path of motion of end 17a of the intermediate lever 17. When the release slide 18 is actuated, tab 18b engages end 17a and thereby cocks spring 19. As a result, the other end 17b of intermediate lever 17 engages lug 12c of the polarity reversal slide 12, and causes the latter to engage, in turn, fork 9 after the end 17a is disengaged from tab 18b.

In order that the swinging-through blade shutter be able to take photographs of different exposure periods, the shutter arrangement, as described above, is associated with a device that may be controlled by means of an electronic circuit. During the period that the exposure takes place, this device blocks the blade operating ring in the open position of the swinging-through blades 3, for the duration of the exposure time that has been set. The device comprises two coaxially positioned two-armed arresting levers 24 and 25. By means of its arm 24a or 25a respectively, each of these arresting levers engages the magnetic lever 28 due to the action of spring 26 or 27 respectively. The magnetic lever 28 bears in turn, against electromagnet 29. At the other arm 24b or 25b, the arresting levers 24 and 25 are provided with repelling edges 24c and 25c as well as with arresting edges 24d and 25d. During the executing period of the shutter, the edges 24d and 25d cooperate alternately with a projecting member of the blade operating ring 2 as, for example, the permanent magnet 7. The blade operating ring is thereby arrested in the position corresponding to the open position of the blades.

To release the ring 2 blocked in the open position of the blades 3, the magnetic lever 28 rotates the arresting levers 24 and 25 in counterclockwise direction and out of the position shown in FIGURE 1. In this regard, the magnetic lever 28 carries a bar-shaped permanent magnet 30 which adheres to the two poles of the electromagnet 29, for as long as the latter is de-energized. For purposes of controlling the electromagnet 29, the latter is associated with an electronic monostable multivibrator circuit. The circuit may be connected to the battery B by means of a contact switch $K_1$ and includes an adjustable resistor R, a capacitor C, and a plurality of transistors $T_1$, $T_2$ and $T_3$. The adjustable resistor R is formed of a plurality of resistors having different resistance values. However, in lieu of such adjustable stages, one may substitute a continuously adjustable resistor as, for example, a potentiometer. The transistor $T_1$ is arranged in series with the contact switch $K_1$ which may be formed of two fixed junctions I and II, and a switching blade 31 reciprocating between these junctions. The capacitor C is connected to the second transistor $T_2$, as well as the resistor R. The combination of resistor R and capacitor C forms a time-delay circuit. The third transistor $T_3$ is connected in parallel with this RC circuit, and to the coil of electromagnet 29.

In the non-operating position of the shutter, a contact lever 32 provided for actuating the switch $K_1$, engages the pin 33 due to the action of spring 31 of the switch $K_1$. The contact lever 32 is provided with a cam curve 32a on which follower 2c of the blade operating ring, rides up during the first phase of the opening motion of the ring. Follower 2c leaves the cam profile 32a again, shortly before the closing position of the shutter is reached. During this process, contact spring 31 is first conveyed from position I into position II, and then back to position I at the end of the executing motion.

In the circuit of electromagnet 29, is an interrupter switch $K_2$ whose contact spring 34 is held in the closed position through arresting pin 35. The pin 35 cooperates, in turn, with the exposure time setting member of the camera so that the pin maintains the arresting position shown in FIGURE 1 when the camera is set to an instantaneous expoure time. When the camera is switched over for obtaining "B" exposures, the arresting pin transfers to the position indicated by the dash-dot line. In order to actuate the interrupter switch $K_2$ in a "B" setting, the release slide 18 is provided with another lug 18c on which the contact spring 34 rests.

The swinging-through blade shutter described above and illustrated in FIGURES 1 to 8, operates in the following manner:

When the shutter is released by depressing the release slide 18, the tab 18b impinges upon the end 17a of lever 17. The latter moves, thereby, clockwise, and slides past and over the inclined projecting lug 12c of the polarity reversal slide 12. At the same time spring 19 becomes cocked. In the final phase of the release motion, which is shortly before the release slide 18 impinges on the guide pin 21, the end 17b of lever 17 drops behind lug 12c of the slide 12. The other end 17a is, at the same time, disengaged from the lug 18b. Due to the action of spring 19, the lever 17 now executes a counterclockwise rotation, and this conveys the slide 12 into the contact position with fork 9 due to the action of spring 14, as illustrated in FIGURES 5 and 6. The arrow-shaped projection 12d with the hook-shaped ends 15c and 16d of contact members 15 and 16 embedded in the slide 12, is thereby pushed between contact springs 10 and 11 cast into the arm 9c of fork 9. In the contact position in which, according to FIGURE 6, the bent-up members 10b and 11b have been located behind contact ends 15c and 16d, the lever end 17b is disengaged from the lug 12c.

When electrical contact is established between fork 9 and the polarity reversal slide 12, current flows through the coil 5. As a result, a field is generated in the electromagnet 5–6. Due to the specific direction of the current, the electromagnetic field has its south pole at location 6a, and its north pole at location 6b. Since the free end of the permanent magnet 7 is a south pole, the latter is repelled by pole 6a and attracted simultaneously by pole 6b.

While the blade operating ring 2 rotates counterclockwise out of the initial position of FIGURE 1 and moves into the open position, the free end of magnet 7 slides along the repelling edge 24c of the arresting lever 24. The latter is thereby caused to rotate against the action of spring 26. When the open position illustrated in FIGURE 7 is reached, the permanent magnet 7 is blocked by the arresting lever edge 25d, and edge 24d falls again behind the free end of this magnet 7.

In the first phase of the opening motion of the blade operating ring 2, follower 2c on ring 2 rides up the cam profile 32a on contact lever 32. The contact spring 31 of switch $K_1$ is, thereby, conveyed from position I into position II. This has, in turn, the effect that the electronic circuit is connected to the battery B, transistor $T_1$ conducts, and transistors $T_2$ and $T_3$ are cut off. At the same time, capacitor C begins to charge. The time required to obtain the voltage level at which transistor $T_2$ conducts, depends on the capacitance of capacitor C and on the value of resistor R. The magnitude of resistance R can be adjusted by means of the exposure time setting member.

When the capacitor C reaches the base voltage of the transistor $T_2$, the latter starts to conduct. As a result, transistor $T_1$ is cut off and transistor $T_3$ conducts. Electromagnet 29 is consequently, energized, and its magnetic field is directed so that permanent magnet 30 is repelled by the electromagnet. During this process, the magnetic lever 28 moves clockwise by a certain amount, thereby rotating the two arresting levers 24 and 25 against the action of springs 26 and 27. The arresting lever edge 25d is therefore, moved out of the range of motion of the permanent magnet 7. In this way, the latter and the blade operating ring 2 are able to continue their counterclockwise motion and to convey the blades 3 into the closing position shown in FIGURE 8. In this position, the lens aperture is covered by the other wing of the swinging-through blades 3. The permanent magnet 7 remains in this extreme position, until the release slide 18 is operated for the next exposure and electromagnet 5–6 becomes energized again.

In the final phase of the closing motion described above for the blade operating ring 2, the latter's driving pin 2b impinges upon the arm 9a of fork 9, and this rotates the fork in clockwise direction and into the extreme position shown in FIGURE 8. The contact springs 10 and 11 of fork 9 are thereby disengaged from the contact members 15 and 16, and accordingly the slide 12 is able to return to its initial position due to the action of restoring spring 14. In addition to this, and in the final phase of the closing motion of the blade operating ring 2, the projection 2c moves out of the range of motion of the contact lever 32. In this way the contact blade 31 of switch $K_1$ is able to return to the position I from position II. The electromagnet 29 is thus de-energized, and the permanent magnet 30 engages the poles of this electromagnet due to its own magnetic effect. As a result, the arresting levers 24 and 25 also return to their initial position because of the action of springs 26 and 27.

When the release slide 18 is actuated again, the hook-shaped bent-up members 15d and 16c of contacts 15 and 16 are re-engaged with the bent ends 11b and 10b of contact springs 11 and 10. When compared with the process described above, the electric connection between the polarity reversal slide 12 and the fork 9 is now reversed, and accordingly the current in coil 5 of electromagnet 5–6 also flows in the opposite direction. The permanent magnet 7 is thereby repelled by the pole 6b and attracted by the pole 6a. With this condition, magnet 7 is now blocked by the arresting lever edge 24d in the intermediate position. This coincides with the open position of the blades 3, corresponding to the setting of the pre-selected exposure time. To release magnet 7 so that it may continue its motion and close the shutter, permanent magnet 30 cooperates again with the electronically controlled electromagnet 29. At the end of the executing motion, the pin 2b strikes against the arm 9b of fork 9 which is thus returned to the position shown in FIGURE 1. At the same time, the lug 2c of the blade operating ring is disengaged from the contact lever 32. As a result, switch $K_1$ is opened and the electronic circuit is disconnected again from the battery B.

If "B" exposures are to be carried out with the shutter arrangement described above, the exposure time setting member is set to the corresponding position. Arresting pin 35 is thereby moved away from the contact blade 34 of switch $K_2$, and into the position indicated by the dash-dot line in FIGURE 1. Due to the bridging of resistor R, moreover, capacitor C is charged immediately upon the closure of contact switch $K_1$. Upon depression of the released slide 1, the electromagnet 5–6 is again energized, with the result that permanent magnet 7 transfers out of its extreme position fixed by the pole 6a or 6b, and moves towards the opposite pole. In the open position of the swinging-through blades 3, the permanent magnet 7 is blocked by the arresting edge 25d or 24d in the manner described above.

Since the interrupter switch $K_2$ was open when the release slide 18 was actuated, electromagnet 30 is in the deenergized state. The blade operating ring 2 is therefore, retained in the intermediate position coinciding with the open position of blades 3, for as long as the release slide 18 remains depressed. After release slide 18 is liberated, it returns to its initial position due to the action of compression spring 23. With this action, the release slide closes again the interupter switch $K_2$. At the same instant, the coil of electromagnet 29 is energized, because resistor R is effectively removed from the circuit and capacitor C is charged immediately upon contact closure. As a result, the permanent magnet 30 is repelled again by electromagnet 29, and the arresting effect of the lever 24 or 25 is, thereby, eliminated. The permanent magnet 6 is thus able to continue its motion together with the blade operating ring 2. While the swinging-through blades 3 occupy the open position, the electromagnet 5–6 remains energized. This results from the condition that the driving pin 2b impinges upon the corresponding arm of fork 9 only at the end of the closing motion of the blade operating ring 2.

According to the shutter arrangement illustrated in FIGURE 9, the polarity reversal of the driving electromagnet 5–6 may be coupled to a manually-operated member which is actuated by the photographer to set the camera into the operable state.

In this regard, it is possible to use, for example, the film transport device, as shown in FIGURE 9. The film may be moved by the amount of one picture-length after each exposure, by means of the rotatably positioned lever 40. Mounted coaxially with this lever 40 is a ratchet wheel 41 which is engaged by the spring-loaded pawl 42. The ratchet 41 carries a driving pin 43 which moves within the guide slot 44a of a rotatably positioned polarity reversing lever 44. The polarity reversing lever carries, in turn, two contact strips 10' and 11' which are insulated from one another. Associated with these two contact strips, are two intersecting contact members 15' and 16'. The latter are insulated from one another, and each has two taps 15c' and 15d' or 16c' and 16d', respectively. In the extreme position of the swinging-through blades shutter, the taps 15c' and 16d' engage the contact strips 10' and 11'. Consequently, after contact switch $K_3$ is closed, coil 5 of electromagnet 5–6 is energized. In this manner identical to that described above, the energizing of coil 5 produces the result by which the permanent magnet 7 and the blade operating ring 2 are moved in counterclockwise direction, and cause, thereby, the blades 3 to uncover and then recover the lens aperture.

After the exposure process, the lever 40 rotated through half a revolution in order to transport the film by the amount of one picture-length. This same rotary motion is transmitted to the ratchet wheel 41 and to the driving pin 43 fixed to the ratchet. The polarity reversing lever 44 is, thereby, moved into the position outlined by the dash-dot lines in FIGURE 9. In this position the contact strips 10' and 11' are engaged by the taps 16c' and 15d'. Upon the next circuit closure of switch $K_3$, the current in coil 5 flows in the opposite direction, and accordingly permanent magnet 7 and the blade operating ring 2 are moved in the clockwise direction. In the manner identical to that described above, the permanent magnet 6 is blocked by the arresting levers 24 and 25 in the center position of the blade operating ring 2, corresponding to the open position of the blades 3 and to the exposure time which has been set. Again the unblocking procedure is performed by the electromagnet 29 which is controlled by the electronic circuit illustrated in FIGURE 2.

Similar to the shutter arrangement shown in FIGURES 1 to 8 the contact switch $K_3$ is actuated by the release slide 18 which cooperates with an angular intermediate lever 45. The initial positions of the release slide and the intermediate lever are indicated in FIGURE 9 by means of dash-dot lines. Again, a bent-up two-armed contact lever 46 is associated with the actuating lever 45. When the shutter is in the non-operating position, the contact lever 46 engages the pin 48 due to the action of spring 47. The arm 46a of the contact lever is provided with a cam profile 46b, on which the follower 2c of the blade operating ring 2 rides up in the first phase of the opening motion of the ring. In this manner, switch K₃ which supplies current to electromagnet 5–6 for the shutter drive, and to the electronic circuit and electromagnet 29, is held in the closed position by the blade operating ring during the executing period of the shutter.

Upon actuation of the release slide 18, the intermediate lever 45 is rotated clockwise by the bent-up tab 18b of the slide, and against the action of spring 49. During this process and at the end of the release motion, the intermediate lever end 45a drops behind the beveled driving lug 46c which is bent up on contact lever 46. At the same time, the intermediate lever 45 is disengaged from the lug 18b. Due to the action of the spring 49, the lever 45 executes a counterclockwise rotary motion, and thereby guides the contact lever 46 into the position in which the switch K₃ is closed. Immediately thereafter, the blade operating ring 2 rotates and retains switch K₃ closed by means of the follower 2c, while the intermediate edge 45a is disengaged from the contact level lug 46C.

It will be understood that while the invention has been described in detail in connection with specific embodiments thereof in order to describe the same this description is not to be considered as a limitation upon the scope of the invention. Variations and modifications may be made without departing from the spirit of the invention or defined in the appended claims.

What is claimed is:

1. A photographic camera with swinging-through shutter blades and a blade operating ring which actuates the blades and which is capable of rotation in one direction during an exposure process and in the opposite direction during the next exposure, characterized by: electromagnetic means for driving said blade operating ring; means for reversing the direction of currrent through said electromagnetic means after the exposure process; and exposure time setting member by which the desired exposure time may be pre-set; mechanical means associated with said electromagnetic means for blocking said blade operating ring for the duration of said pre-set exposure time with said shutter blades in the open position; an electromagnetically operated actuating device associated with said mechanical means; and an electronic circuit for controlling said electromagnetically operated actuating device, said actuating device moving said mechanical means which blocks said blade operating ring, out of the blocking position at the expiration of said exposure time.

2. The photographic camera as defined in claim 1, wherein said electromagnetic means for driving said blade operating ring comprises a fixed electromagnet, and a permanent magnet fixed to said blade operating ring, said permanent magnet having a free end projecting into the magnetic field of said electromagnet, and said electromagnet being connectable to a battery by means of a switch movable into its closed position through an intermediate lever which is conveyed into cocked position during actuation of a release member of said camera.

3. The photographic camera as defined in claim 2, wherein said means for reversing the direction of current through said electromagnetic means includes: a control element conveyable into two extreme positions; two contact elements carried by said control element; a battery, each of said contact elements being connected to a pole of said battery; and two intersecting contact members associated with said contact elements, said contact members being electrically connected to said electromagnet adapted to drive said blade operating ring and being provided with two contact taps for each intersecting contact member in an arrangement by which said current flows in one direction through said electromagnet when said control element is in one extreme position, and flows in the opposite direction when said control element is in the other extreme position.

4. The photographic camera as defined in claim 3, including a polarity reversal means which receives said two intersecting contact members, and wherein said control element comprises a rotatably positioned three-armed fork, two arms of said fork extending toward the center of said blade operating ring and cooperating alternately with a projection on said ring in a manner such that said projection impinges on one of said two arms and moves said fork from one extreme position into the other in the final phase of the operation of said shutter, and the third arm of said fork carrying two contact springs and being cooperably and electrically connected to said polarity reversal means in said extreme positions.

5. The photographic camera as defined in claim 4, wherein said polarity reversal means may be connected to said three-armed fork against the action of a restoring spring by means of said intermediate lever, said connection being releasable by the impingement of said ring projection on said fork, and said polarity reversal means being movable into its initial position by said restoring spring.

6. The photographic camera as defined in claim 4, wherein said intersecting contact members are constructed in the form of an h, the left leg of said h being designated as the long leg and the right leg of said h being designated as the short leg, said intersecting contact members being situated within said polarity reversal means so that bases of said intersecting h members point in the same direction, and the long leg of one member is located, respectively, above the short leg of the other member to form superjacent legs.

7. The photographic camera as defined in claim 6, wherein the ends of said superjacent legs project from said polarity reversal means from one side, and said polarity reversal means has on said side two arrow-shaped lugs each of which is situated between two ends of said superjacent legs.

8. The photographic camera as defined in claim 1, wherein said mechanical means for blocking said blade operating ring in the open position of said blades, comprises two coaxially positioned arresting levers, and a spring associated with each of said levers for holding said levers in the arresting position, each of said levers being provided with an arresting edge located within the range of motion of a projection of said ring and retaining said ring in the open position of the swinging-through blades corresponding to the duration of the pre-set exposure time.

9. The photographic camera as defined in claim 8, wherein said actuating device includes the combination of a magnetic lever, an electromagnet for supporting said magnetic lever and a permanent magnet associated with said electromagnet, said combination being provided for moving said arresting levers out of the arresting position.

10. The photographic camera as defined in claim 9, wherein said electronic circuit includes a switch for connecting said electromagnet which supports said magnetic lever to a battery, said blade operating ring being capable of closing said switch, and said electromagnet associated with said magnetic lever being controllable by said electronic circuit settable by the exposure time setting member, in the manner such that, after the expiration of the pre-set exposure time, said electromagnet becomes energized and repels said permanent magnet associated therewith, to convey said arresting levers into the non-operating position.

11. The photographic camera as defined in claim 10, wherein said electronic circuit includes an interrupter switch connected into the circuit of said electromagnet associated with said magnetic lever and arresting levers, said interrupter switch being closed when said exposure time setting member is set within the range of instantaneous exposure times, and being conveyed to the open position upon actuation of the camera release member when said exposure time setting member is set at "B."

12. The photographic camera as defined in claim 3, wherein said control element for reversing the current direction comprises a two-armed lever movable alternately into one of two extreme positions by the film transport lever of the camera.

13. The photographic camera as defined in claim 9, including a third contact switch for connecting to a battery, the electromagnet provided for driving the blade operating ring, the electromagnet associated with the magnetic and arresting levers, and the electronic circuit, said third contact switch being closable by the camera release member and being held in the closed position by the blade operating ring during the execution motion of said ring.

References Cited

UNITED STATES PATENTS

| | | | |
|---|---|---|---|
| 2,577,774 | 12/1951 | Lee | 95—53 |
| 3,095,795 | 7/1963 | Yates | 95—53 |
| 3,223,014 | 12/1965 | Weller | 95—61 |
| 3,357,333 | 12/1967 | Starp | 95—61 |

FOREIGN PATENTS

| | | |
|---|---|---|
| 381,084 | 10/1964 | Switzerland. |

JOHN M. HORAN, Primary Examiner